United States Patent [19]

Agano

[11] Patent Number: 4,551,626
[45] Date of Patent: Nov. 5, 1985

[54] METHOD OF CORRECTING RADIATION IMAGE READ-OUT ERROR

[75] Inventor: Toshitaka Agano, Kanagawa, Japan

[73] Assignee: Fuji Photo Film Co., Ltd., Kanagawa, Japan

[21] Appl. No.: 618,859

[22] Filed: Jun. 8, 1984

[30] Foreign Application Priority Data

Jun. 9, 1983 [JP] Japan .................................. 58-103067

[51] Int. Cl.$^4$ .............................................. G03C 5/16
[52] U.S. Cl. ................................... 250/327.2; 250/347
[58] Field of Search ................... 250/327.2, 484.1, 351, 250/347, 235, 350; 350/6.6; 346/109; 358/208, 293; 364/414

[56] References Cited

U.S. PATENT DOCUMENTS 4,404,596 9/1983 Juergensen et al. ................. 358/293
4,484,073 11/1984 Ohara et al. ......................... 250/347

Primary Examiner—Alfred E. Smith
Assistant Examiner—Carolyn E. Fields
Attorney, Agent, or Firm—Sughrue, Mion, Zinn, Macpeak, and Seas

[57] ABSTRACT

In a radiation image read-out system, a stimulable phosphor sheet carrying a radiation image stored therein is scanned by stimulating rays in forward and backward main scanning directions by use of galvanometer mirrors. Light emitted from the stimulable phosphor sheet upon exposure to the stimulating rays is detected and converted into an electric image signal at each position on forward and backward scan lines. The electric image signal is corrected by use of a correction coefficient predetermined for each position on the scan lines in accordance with the deviation in position in a sub-scanning direction at each position on the scan lines, thereby correcting a read-out error in the image signal caused by distortion of the scan lines arising when the stimulable phosphor sheet is scanned by the stimulating rays in the forward and backward main scanning directions by use of the galvanometer mirrors.

5 Claims, 4 Drawing Figures

METHOD OF CORRECTING RADIATION IMAGE READ-OUT ERROR

BACKGROUND OF THE INVENTION

1. Field of the Invention

This invention relates to a method of correcting a read-out error of image signals read out by scanning a stimulable phosphor sheet carrying a radiation transmission image stored therein. This invention particularly relates to a method of correcting an image signal read-out error caused by distortion of scan lines in the forward main scanning direction and the backward main scanning direction when the stimulable phosphor sheet carrying a radiation transmission image stored therein is scanned by stimulating rays in the forward and backward main scanning directions by use of galvanometer mirrors and light emitted from the stimulable phosphor sheet in proportion to the stored radiation energy upon exposure to the stimulating rays is photoelectrically read out and converted into image signals.

2. Description of the Prior Art

When certain kinds of phosphors are exposed to a radiation such as X-rays, α-rays, β-rays, γ-rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet or simply as a sheet) is first exposed to a radiation passing through an object to have a radiation image stored therein, and is then scanned with stimulating rays such as a laser beam which cause it to emit light in the pattern of the stored image. The light emitted from the stimulable phosphor sheet upon stimulation thereof is photoelectrically detected and converted to an electric image signal, which is processed as desired to reproduce a visible image on a recording medium such as a photographic light-sensitive material or on a display device such as a cathode ray tube (CRT).

FIG. 1 is a schematic view showing an example of a radiation image read-out apparatus employed in the aforesaid radiation image recording and reproducing system.

In the apparatus of FIG. 1, a radiation image stored in a stimulable phosphor sheet is read out by scanning the sheet with a laser beam as stimulating rays in the forward and backward main scanning directions. A laser beam 1a of a predetermined intensity emitted from a laser beam source 1 is slightly deflected by a subsidiary galvanometer mirror 2a into a laser beam 1b. By a main scanning galvanometer mirror 2b, the slightly deflected laser beam 2b is further deflected in the main scanning direction as indicated by the arrow A to form a laser beam 1c. Thus the laser beam 1c impinges upon a stimulable phosphor sheet 3 and scans it in the main scanning direction. In this case, the direction of slight deflection by the subsidiary galvanometer mirror 2a is normal to the direction of deflection by the main scanning galvanometer mirror 2b, i.e. to the main scanning direction.

Namely, as a result of the slight deflection of the laser beam 1b by the subsidiary galvanometer mirror 2a, the laser beam 1c is slightly deflected in the direction as indicated by the arrow B with respect to the main scanning direction as indicated by the arrow A on the stimulable phosphor sheet 3. While the laser beam 1c impinges upon the stimulable phosphor sheet 3, the sheet 3 is conveyed at a predetermined speed in the direction as indicated by the arrow B (sub-scanning direction), for example, by an endless belt device 9. Therefore, scanning in the main scanning direction is repeated at an angle approximately normal to the sub-scanning direction, and the whole surface of the stimulable phosphor sheet 3 is two-dimensionally scanned by the laser beam 1c. As the stimulable phosphor sheet 3 is scanned by the laser beam 1c, the portion of the sheet 3 exposed to the laser beam 1c emits light having an intensity proportional to the radiation energy stored. The light emitted from the stimulable phosphor sheet 3 enters a transparent light guide member 4 from its front end face 4a positioned close to the sheet 3 in parallel to the main scanning line. The light guide member 4 has a flat-shaped front end portion 4b positioned close to the stimulable phosphor sheet 3 and is shaped gradually into a cylindrical shape towards the rear end side to form an approximately cylindrical rear end portion 4c which is closely contacted with a photomultiplier 5. The light emitted from the stimulable phosphor sheet 3 upon stimulation thereof and entering the light guide member 4 from its front end face 4a is guided inside of the light guide member 4 up to the rear end portion 4c, and received by the photomultiplier 5. Thus the light emitted from the stimulable phosphor sheet 3 in proportion to the radiation energy stored therein is detected and converted into an electric image signal by the photomultiplier 5. The electric image signal thus obtained is sent to an image processing circuit 6 and processed therein. The electric image signal thus processed is then reproduced into a visible image and displayed, for example, on a CRT 7, or stored in a magnetic tape 8.

FIG. 2 is a schematic view showing the scan lines of the laser beam scanning on the stimulable phosphor sheet in the apparatus of FIG. 1 and the waveforms of signals for driving the galvanometer mirrors.

In FIG. 2, solid lines L1, L2, L3, L4 and L5 designate scan lines drawn by a laser beam impinging upon the stimulable phosphor sheet 3 when only the main scanning galvanometer mirror 2b is activated without operating the subsidiary galvanometer mirror 2a. In this case, since the scan lines have a predetermined width (approximately 100 μm), they overlap or separate from each other at their end portions and, as a result, the electric image signals obtained by scanning the stimulable phosphor sheet 3 with the laser beam become incorrect. Therefore, the aforesaid subsidiary galvanometer mirror 2a is used to scan so that the forward scan lines L1, L3 and L5 are parallel to the backward scan lines L2 and L4. For this purpose, the main scanning galvanometer mirror 2b is operated by a main scanning signal S0 as shown at the right end side of FIG. 2 to conduct scanning in the main scanning direction, and the subsidiary galvanometer mirror 2a is operated by a slight deflection signal S1. As a result, the forward scan lines L1, L3 and L5 are formed as shown in FIG. 2, and the backward scan lines L2 and L4 shift in the sub-scanning direction to form backward scan lines L2' and L4' as indicated by the dotted lines parallel to the forward scan lines L1, L3 and L5.

In this manner, a radiation image stored in a stimulable phosphor sheet can be read out in both forward and backward scan directions by scanning the stimulable phosphor sheet by a laser beam in the forward and backward main scanning directions. However, the rotation angle of the subsidiary galvanometer mirror 2a for slightly deflecting the laser beam is very small, and it is not always possible to control the rotation angle of the subsidiary galvanometer mirror 2a so that the rotation angle exactly conforms to the slight deflection signal S1 as shown at the right side of FIG. 2. As a result, the backward scan lines do not become parallel to the forward scan lines, but instead are partially distorted. Thus the forward scan lines and the backward scan lines partially overlap or separate from each other at both end portions of the scan lines as shown in FIG. 3B, and electric image signals obtained by reading out the radiation image stored in the stimulable phosphor sheet become incorrect.

FIG. 3B is a schematic view showing the case where forward scan lines and backward scan lines partially overlap or separate from each other due to an error in the slight deflection by the subsidiary galvanometer mirror 2a. In this case, in overlapping portions bi, bi+1, . . . , image read-out by scanning is conducted also for the portion where the stimulable phosphor of the stimulable phosphor sheet was stimulated and the radiation energy stored therein was erased by the previous scanning. In separating portions ci, ci+1, . . . , the radiation energy stored in the stimulable phosphor at these portions is not stimulated nor detected. Therefore, electric image signals obtained by scanning the stimulable phosphor sheet in this manner are incorrect, and an image reproduced by use of the electric image signals becomes incorrect or unsharp. Such a read-out error can be corrected and a correct electric image signal can be obtained by installing an optical error correcting means such as a light deflector in the laser beam path to prevent the forward scan lines and backward scan lines from overlapping and separating from each other. However, an optical error correcting means such as a light deflector has a complicated configuration so that when the optical error correcting means is incorporated in a radiation image read-out apparatus it is difficult or impossible to minimize the size of the radiation image read-out apparatus and to reduce the cost thereof.

SUMMARY OF THE INVENTION

The primary object of the present invention is to provide a method of simply correcting the radiation image read-out error arising due to distortion of forward scan lines and backward scan lines when a stimulable phosphor sheet carrying a radiation image stored therein is scanned by a laser beam in the forward and backward main scanning directions by use of galvanometer mirrors and light emitted from the stimulable phosphor sheet upon exposure to the laser beam is detected and converted into image signals.

Another object of the present invention is to provide a method of correcting a radiation image read-out error, which minimizes the size of the radiation image read-out apparatus and reduces the cost of the apparatus.

The method of correcting a radiation image read-out error in accordance with the present invention comprises the steps of:

(i) scanning a stimulable phosphor sheet carrying a radiation transmission image stored therein by stimulating rays in forward and backward main scanning directions by use of galvanometer mirrors, (ii) photoelectrically detecting light emitted from said stimulable phosphor sheet upon stimulation thereof by said stimulating rays scanning in the forward and backward main scanning directions and converting the emitted light into an electric image signal of said radiation transmission image at each position on scan lines in the forward main scanning direction and in the backward main scanning direction, and (iii) correcting said electric image signal by use of a correction coefficient predetermined for each position on said scan lines in the forward main scanning direction and in the backward main scanning direction in accordance with the deviation in position in a sub-scanning direction at said each position on said scan lines, thereby correcting a read-out error in said image signal caused by distortion of said scan lines arising when said stimulable phosphor sheet is scanned by said stimulating rays in the forward and backward main scanning directions by use of the galvanometer mirrors.

In the present invention, after an electric image signal is obtained by scanning and photoelectrically reading out a radiation transmission image stored in a stimulable phosphor sheet, distortion of scan lines can be corrected by arithmetically processing the electric image signal for each position on the scan lines by use of a correction coefficient predetermined in accordance with the deviation of the scan lines at each position of the forward scan lines and the backward scan lines. Therefore, correction of distortion of scan lines can be accomplished simply without using a complicated correction means such as a light deflector or other optical error correcting means. Further, the method of the present invention is advantageous in minimizing the size of a radiation image read-out apparatus and reducing the cost thereof.

DESCRIPTION OF THE PREFERRED EMBODIMENTS

The present invention will hereinbelow be described in further detail with reference to the accompanying drawings.

Figure 1:
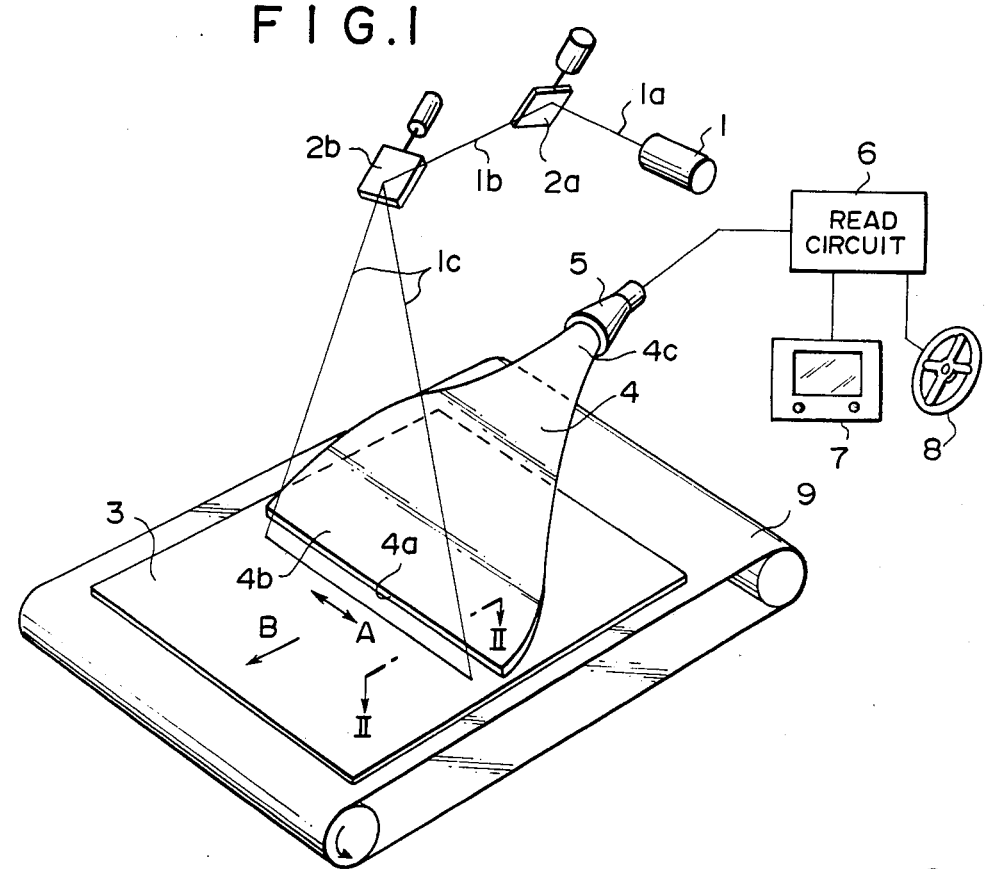
FIG. 1 is a schematic view showing an example of a radiation image read-out apparatus.
Figure 2:
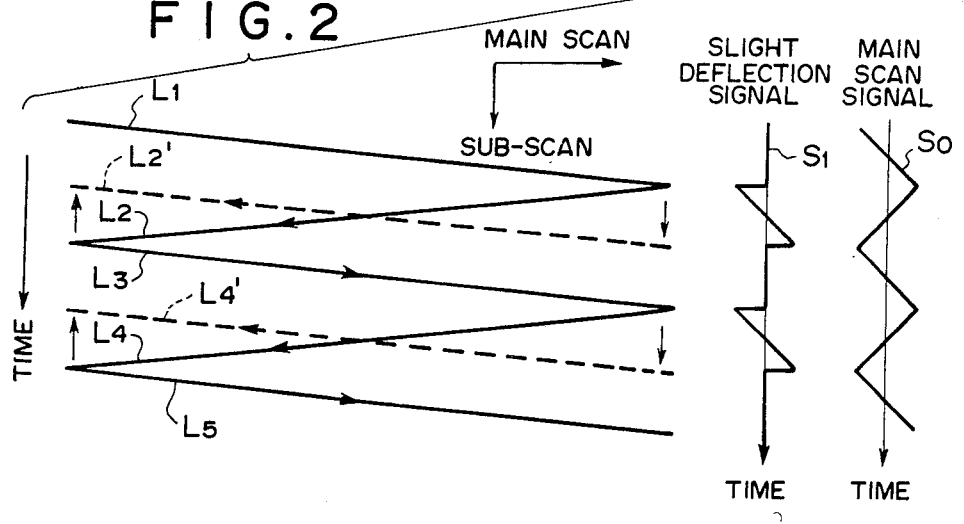
FIG. 2 is a schematic view showing scan lines of a laser beam scanning on a stimulable phosphor sheet in the apparatus of FIG. 1 and waveforms of signals for driving galvanometer mirrors of the apparatus.
Figure 3A:
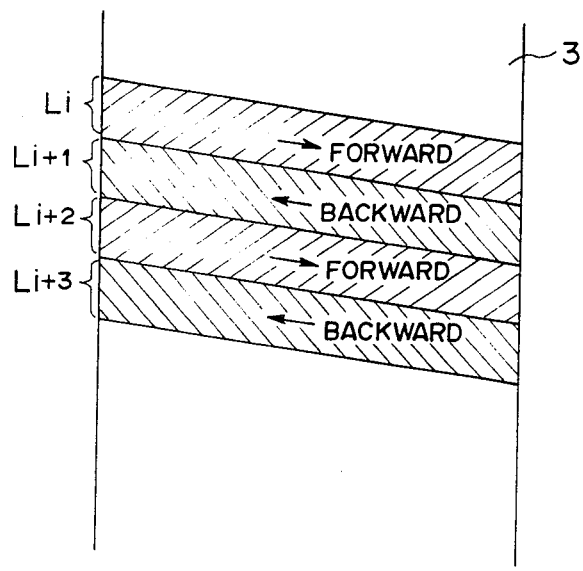
FIG. 3A is a schematic view showing distortion-free scan lines of a laser beam scanning on a stimulable phosphor sheet, the widths of the scan lines being enlarged as compared with the widths thereof in FIG. 2.
Figure 3B:
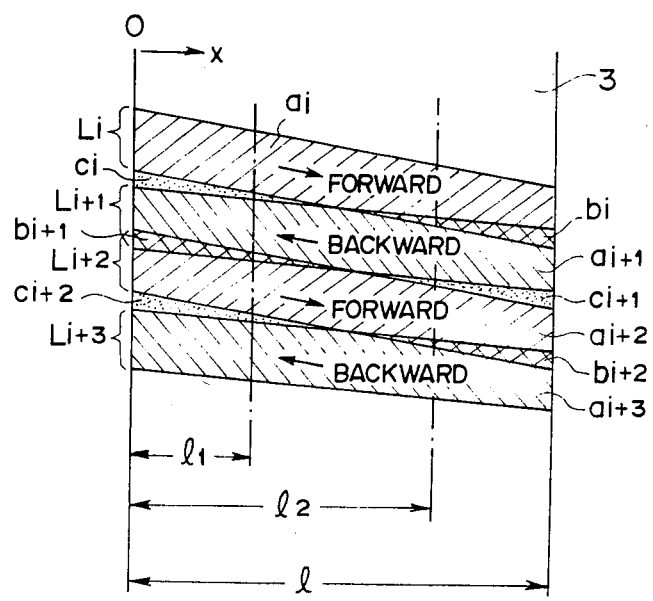
FIG. 3B is a schematic view showing distorted scan lines of a laser beam scanning on a stimulable phosphor sheet, the widths of the scan lines being enlarged as compared with the widths thereof in FIG. 2.

FIGS. 3A and 3B show scan lines drawn by the laser beam 1c on the stimulable phosphor sheet 3 when a radiation transmission image stored in the sheet 3 is read out by scanning the sheet 3 by the laser beam 1c in the main scanning direction by use of the subsidiary galvanometer mirror 2a and the main scanning galvanometer mirror 2b while the sheet 3 is moved at a predetermined speed in the sub-scanning direction by the endless belt device 9 as shown in FIG. 1. FIG. 3A shows the positions of the scan lines when they are not distorted, and FIG. 3B shows the positions of the scan lines when they are distorted. In any case, since the subsidiary galvanometer mirror 2a and the main scanning galvanometer mirror 2b are operated according to the slight deflection signal S1 and the main scanning signal S0 as shown at the right side of FIG. 2 and since these signals S1 and S0 have no error and are generated with a predetermined period, the forward scan lines are parallel to each other and the backward scan lines are also parallel to each other. Therefore, in FIG. 3B, it is sufficient to consider deviation in position between a forward scan line and a backward scan line at each position of the scan lines when scanning in the forward main scanning direction is conducted, and deviation in position therebetween when scanning in the backward main scanning direction is conducted. This is because deviations in position between all of the other scan lines are the same as the deviations in the aforesaid two cases. In FIGS. 3A and 3B, the widths (thickness) of the scan lines are enlarged for simplicity of explanation.

When the forward scan lines and the backward scan lines are not distorted, i.e. when the subsidiary galvanometer mirror 2a and the main scanning galvanometer mirror 2b are accurately operated in accordance with the slight deflection signal S1 and the main scanning signal S0, respectively, all of forward scan lines Li, Li+2, ..., and backward scan lines Li+1, Li+3, ..., are parallel in contact with each other as shown in FIG. 3A.

In FIG. 3B showing the positions of the forward scan lines and the backward scan lines when they are distorted, bi, bi+1, bi+2, ... designate the portions where the scan lines overlap, and ci, ci+1, ci+2, ... designate the portions where the scan lines separate from each other. The forward scan lines Li, Li+2, ... are parallel to each other in equally spaced relation, and the backward scan lines Li+1, Li+3, ... are also parallel to each other in equally spaced relation.

First, the case where scanning along the forward scan line Li is conducted and then scanning along the backward scan line Li+1 is carried out will be considered hereinbelow. As shown in FIG. 3B, each position on the scan lines is indicated by a distance x as measured rightwardly with respect to the origin taken on the left edge of the stimulable phosphor sheet 3. Assuming that the correction coefficient at each position on the scan lines is f(x) and the amount of the signal detected at each position on the backward scan line Li+1 is ai+1(x), the corrected signal amount Ai+1(x) is represented by Ai+1(x)=f(x)×ai+1(x). The correction coefficient f(x) is predetermined for each position on the scan lines in accordance with the degree of distortion of the scan lines. For example, in a position at a distance l1 from the left edge of the stimulable phosphor sheet 3, the backward scan line Li+1 is separated by a distance of the portion as indicated by ci from the forward scan line Li. However, since the widths of the scan lines are always maintained constant, when the change in the intensity of the stored radiation energy in the sub-scanning direction between the portion ci and the portion corresponding to the backward scan line Li+1 on the stimulable phosphor sheet 3 in the position at the distance l1 from the left edge of the sheet 3 is small, the corrected signal amount Ai+1(l1) can be approximately represented by the read-out signal amount ai+1(l1), i.e. Ai+1(l1)≈ai+1(l1). Actually, since the widths of the scan lines are very small (approximately 100 μm), the change in the intensity of the stored radiation energy across such widths is negligible, and no problem arises when it is regarded that Ai+1(l1)=ai+1(l1). In this case, the correction coefficient is f(l1)=1.

In the position at a distance of l2 from the left edge of the stimulable phosphor sheet 3, the backward scan line Li+1 overlaps the forward scan line Li at the portion as indicated by bi. In this case, since the radiation energy stored in the overlapping portion bi has been released therefrom by the scanning with the laser beam along the forward scan line Li, the amount of the electric image signals detected by scanning along the backward scan line Li+1 becomes smaller than when the backward scan line Li+1 does not overlap the forward scan line Li. Therefore, it is necessary to compensate for the amount of the radiation energy previously released from the overlapping portion bi by use of a correction coefficient. By considering that the change in the intensity of the stored radiation energy in the subscanning direction is negligible within the range of the scan line width of approximately 100 μm as described above, correction can be conducted by increasing the amount of the read-out electric image signal by a predetermined amount (i.e. by an amount corresponding to the radiation energy stored on the overlapping portion bi). In this case, the correction coefficient is $f(l2)>1$ and the corrected signal amount can be calculated by $$Ai+1(l2)=f(l2)\times ai+1(l2).$$

When the correction coefficients are predetermined over the sheet width of x=0 to 1, it becomes possible to conduct correction at all positions on the backward scan line by calculating $Ai+1(x)=f(x)\times ai+1(x)$.

Also for the forward scan line, when a correction coefficient g(x) is predetermined for each position, it becomes possible to find a corrected signal amount Ai(x) from a read-out signal amount ai(x) by $$Ai(x)=g(x)\times ai(x).$$

By predetermining the correction coefficient f(x) for one backward scan line and the correction coefficient g(x) for one forward scan line, it is possible to conduct correction by using the correction coefficients f(x) and g(x) in the same manner for all of the backward scan lines and the forward scan lines. The correction coefficients can be predetermined by scanning a stimulable phosphor sheet uniformly exposed to a radiation over the whole surface thereof, detecting the light emitted from the stimulable phosphor sheet and converting it into electric image signals, and determining the correction coefficients so that the read-out electric image signals are the same at all positions on the stimulable phosphor sheet.

Besides the method wherein correction is conducted by multiplying the read-out signal amount by the predetermined correction coefficient as described above, it is also possible to conduct correction by detecting a signal ai(x) at each position on the stimulable phosphor sheet, calculating the signal amount bi(x) of an overlapping portion on the basis of a corrected signal Ai-1(x) on the scan line just prior to the position where the signal ai(x)

is detected (for example, in the case where the signal $ai(x)$ is detected in the scanning along a forward scan line, the backward scan line just prior to this forward scan line), and adding the signal amount $bi(x)$ to the signal $ai(x)$. Specifically, the signal amount $bi(x)$ is represented by $bi(x) = h(x) \times A_{i-1}(x)$ where $h(x)$ designates the correction coefficient with respect to the degree of overlapping. Therefore, the same correction as described above can be achieved by calculating the corrected signal amount $Ai(x)$ as $Ai(x) = ai(x) + h(x) \times A_{i-1}(x)$. In this case, $h(x) > 0$ when the scan lines overlap, and $h(x) = 0$ when the scan lines contact or separate from each other.

As described above, it is possible to correct an error in signal amount caused by distortion of the forward scan lines and the backward scan lines by correcting the read-out image signal by use of the correction coefficient predetermined for each position on the stimulable phosphor sheet. Though FIG. 3B shows the case where the forward scan lines and the backward scan lines are straight lines and the angles of inclination thereof are different, correction can be conducted in the same manner also when the forward scan lines or the backward scan lines are distorted to a curvilinear form.

I claim:

1. A method of correcting a radiation image readout error comprising the steps of:
   (i) scanning a stimulable phosphor sheet carrying a radiation transmission image stored therein by stimulating rays in forward and backward main scanning directions by use of galvanometer mirrors,
   (ii) photoelectrically detecting light emitted from said stimulable phosphor sheet upon stimulation thereof by said stimulating rays scanning in the forward and backward main scanning directions and converting the emitted light into an electric image signal of said radiation transmission image at each position on scan lines in the forward main scanning direction and in the backward main scanning direction, and
   (iii) correcting said electric image signal by use of a correction coefficient predetermined for each position on said scan lines in the forward main scanning direction and in the backward main scanning direction in accordance with the deviation in position in a sub-scanning direction at each said position on said scan lines.

2. A method as defined in claim 1 wherein correction is conducted by multiplying the amount of said image signal detected at each position on said scan lines by said correction coefficient.

3. A method as defined in claim 2 wherein said correction coefficient is predetermined to be a value of 1 for a position where said scan lines in the forward main scanning direction and in the backward main scanning direction separate from each other, and predetermined to be a value larger than 1 for a position where said scan lines in the forward main scanning direction and in the backward main scanning direction overlap.

4. A method as defined in claim 1 wherein correction is conducted by detecting said image signal in each position on one scan line, multiplying the amount of a corrected signal on the scan line just prior to said one scan line by said correction coefficient, and adding the product thus obtained to said image signal.

5. A method as defined in claim 4 wherein said correction coefficient is predetermined to be a value of 0 for a position where said scan lines in the forward main scanning direction and in the backward main scanning direction contact or separate from each other, and predetermined to be a value larger than 0 for a position where said scan lines in the forward main scanning direction and in the backward main scanning direction overlap.

* * * * *